United States Patent
Jüngling et al.

(10) Patent No.: US 6,271,324 B1
(45) Date of Patent: Aug. 7, 2001

(54) METHOD FOR PREPARING POLYACRYL (METH)ACRYLATES

(75) Inventors: Stephan Jüngling, Mannheim; Christof Mehler, Ludwigshafen; Horst Weiss, Karlsruhe; Susanne Steiger, Römerberg; Axel Müller, Wiesbaden; Helmut Schlaad, Bad Kreuznach; Bardo Schmitt, Mainz, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/297,918

(22) PCT Filed: Nov. 11, 1997

(86) PCT No.: PCT/EP97/06275

§ 371 Date: May 12, 1999

§ 102(e) Date: May 12, 1999

(87) PCT Pub. No.: WO98/23651

PCT Pub. Date: Jun. 4, 1998

(30) Foreign Application Priority Data

Nov. 23, 1996 (DE) .............................. 196 48 565

(51) Int. Cl.⁷ ....................................... C08F 4/56
(52) U.S. Cl. .................. 526/174; 526/173; 526/177; 526/179; 526/180; 526/181; 526/185; 526/187; 526/189; 526/193; 526/209; 526/217
(58) Field of Search ................... 526/173, 174, 526/177, 179, 180, 181, 185, 187, 189, 193, 209, 217

(56) References Cited

U.S. PATENT DOCUMENTS

| | | |
|---|---|---|
| 4,224,429 | 9/1980 | Lehn et al. . |
| 4,826,941 | 5/1989 | Teyssie et al. . |
| 4,927,703 | 5/1990 | Teyssie et al. . |
| 5,656,704 * | 8/1997 | Wang et al. .......................... 526/187 |
| 5,670,592 | 9/1997 | Teyssie et al. . |

FOREIGN PATENT DOCUMENTS 306 714   3/1989   (EP) .
434 316   6/1991   (EP) .

OTHER PUBLICATIONS

J.M.S–Rev. Macr. Chem. Phys, C34 (2), 243–324 (1994) Davis et al.

Macromolecules, vol. 25, No. 18, Aug. 31, 1992, Varshey et al. 4458–4463.

* cited by examiner

Primary Examiner—Helen L. Pezzuto
(74) Attorney, Agent, or Firm—Keil & Weinkauf

(57) ABSTRACT

Homopolymers, copolymers or block copolymers are prepared by anionic polymerization of acrylates and/or methacrylates in the presence of an initiator composition containing A) an organic alkali metal compound,
B) an organic aluminum compound and
C) an additive which forms a complex with the alkali metal cation and is selected from the group consisting of open-chain ethers having at least two ether oxygen atoms, macrocyclic ethers and cryptands, or from the group consisting of quaternary cations of the general formula I

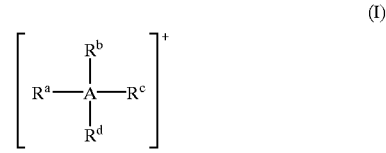

(I)

where
A is N, P, As or Sb and
$R^a$, $R^b$, $R^c$ and $R^d$, independently of one another, are each unsubstituted or substituted alkyl, cycloalkyl, aralkyl or aryl, where two neighboring radicals, together with the heteroatom A, may form a 5- or 6-membered heterocyclic structure which may contain one or two further heteroatoms selected from nitrogen, oxygen and sulfur atoms.

9 Claims, No Drawings

METHOD FOR PREPARING POLYACRYL (METH)ACRYLATES

The present invention relates to a process for the preparation of homopolymers, copolymers or block copolymers by anionic polymerization of acrylates and/or methacrylates in the presence of an initiator composition containing
A) an organic alkali metal compound,
B) an organic aluminum compound and
C) an additive which forms a complex with the alkali metal cation and is selected from the group consisting of open-chain ethers having at least two ether oxygen atoms, macrocyclic ethers and cryptands or from the group consisting of quaternary cations of the general formula I

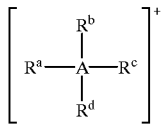
(I)

where
A is N, P, As or Sb and
$R^a$, $R^b$, $R^c$ and $R^d$,
independently of one another, are each unsubstituted or substituted alkyl, cycloalkyl, aralkyl or aryl, where two neighboring radicals, together with the heteroatom A, may form a 5- or 6-membered heterocyclic structure which may contain one or two further heteroatoms selected from nitrogen, oxygen and sulfur atoms.

The present invention furthermore relates to the initiator composition and a process for the preparation of the initiator composition and the use thereof.

The anionic and coordinate polymerization of (meth)acrylates is difficult owing to the secondary reactions associated with the carbonyl group, such as transfer and chain termination reactions, particularly with regard to the regulation of molecular weight, molecular weight distribution and stereoregularity. Various possibilities for the controlled polymerization of (meth)acrylates were reviewed in J.M.S.—Rev. Makromol. Chem. Phys. C34(2) (1994), 243–324, with their advantages and disadvantages.

For example, EP-B-0 274 318 describes the anionic polymerization of acrylate monomers with an alkali metal alkyl or alkaline earth metal alkyl as an initiator in the presence of macrocyclic complexing agents. The process is carried out in tetrahydrofuran at −78° C. Furthermore, LiCl and lithium alcoholates were also used as complexing additives. However, a narrow molecular weight distribution is obtained only at low temperatures, resulting in long polymerization times and technically complicated and expensive apparatuses. Moreover, when tetrahydrofuran is used as a solvent, further safety precautions must be taken owing to peroxide formation.

Macromolecules 25 (1992), 4457–4463, describes the polymerization of methyl methacrylate in toluene with diphenylmethylsodium as an initiator in the presence of macrocyclic crown ethers. The polymethyl methacrylate obtained has only low syndiotacticity.

EP-A-0 434 316 discloses the polymerization of methacrylates by means of alkali metal alkyls in the presence of organic aluminum compounds having bulky radicals. However, the reaction times are still in the region of several hours, even at relatively high temperatures.

A widespread problem in the anionic polymerization of acrylates in the presence of alkyllithium and alkylaluminum compounds is gel formation. This presumably arises because a plurality of molecules (monomers or polymer chains already formed) form coordinate bonds with the central metal. As a result of this phenomenon, on the one hand the reaction mixture is difficult to handle and on the other hand the molecular weight distribution of the polyalkyl acrylates is broad and frequently complete monomer conversion is not achieved.

Metal-free initiation of resonance-free carbanions by ammonium salts is disclosed in EP-A-0 306 714. However, tetraalkylammonium salts tend to undergo Hoffmann elimination in the presence of strong bases, for example uncomplexed carbanions, which leads to chain termination.

It is an object of the present invention to provide a novel initiator composition which permits good control of the polymerization reaction. In particular, it was intended to provide a process which leads to products having a narrow molecular weight distribution even at relatively high temperatures. Furthermore, it was intended to achieve very highly quantitative conversions and to prepare block copolymers. Moreover, the reaction rate should be suitable for industrial purposes. It is a further object of the present invention to provide a process which is substantially insensitive to the impurities present in monomers and solvents of industrial quality. Furthermore, it was intended to provide a process in which gel formation is avoided.

We have found that these objects are achieved by a process for the preparation of homopolymers, copolymers or block copolymers by anionic polymerization of acrylates and/or methacrylates in the presence of an initiator composition containing
A) an organic alkali metal compound,
B) an organic aluminum compound and
C) an additive which forms a complex with the alkali metal cation and is selected from the group consisting of open-chain ethers having at least two ether oxygen atoms, macrocyclic ethers and cryptands, or from the group consisting of quaternary cations of the general formula I

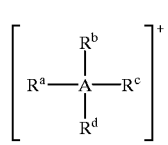
(I)

where
A is N, P, As or Sb and
$R^a$, $R^b$, $R^c$ and $R^d$,
independently of one another, are each unsubstituted or substituted alkyl, cycloalkyl, aralkyl or aryl, where two neighboring radicals, together with the heteroatom A, may form a 5- or 6-membered heterocyclic structure which may contain one or two further heteroatoms selected from nitrogen, oxygen and sulfur atoms.

Suitable polyalkyl (meth)acrylates are both homopolymers and copolymers or block copolymers. For example, copolymers can be prepared from mixtures of different alkyl acrylates or different alkyl methacrylates or mixtures of alkyl acrylates with alkyl methacrylates. Block copolymers can be obtained, for example, from different alkyl acrylates or different alkyl methacrylates or from alkyl acrylates and alkyl methacrylates. In the novel process, both two-block copolymers and multi-block copolymers can be prepared. The composition by weight of the blocks may vary within wide limits.

The suitable alkyl methacrylates include those having 1 to 20, preferably 1 to 10, in particular 1 to 6, carbon atoms in the ester radical. The ester radical may be either linear or branched. The ester radical may also be a cycloalkyl radical. It is preferably linear. The alkyl methacrylates can also be substituted by one or more halogen atoms. Examples are methyl methacrylate, ethyl methacrylate, 2,2,2-trifluoroethyl methacrylate, n-propyl methacrylate, isopropyl methacrylate, n-butyl methacrylate, sec-butyl methacrylate, tert-butyl methacrylate, n-pentyl methacrylate, isopentyl methacrylate, n-hexyl methacrylate, 2-ethylhexyl methacrylate, cyclohexyl methacrylate, n-octyl methacrylate, n-decyl methacrylate and dihydrodicyclopentadienyl methacrylate. Methyl methacrylate is particularly preferably used.

Among the alkyl acrylates, $C_1$–$C_{20}$-alkyl acrylates are preferred. $C_1$–$C_{10}$-alkyl acrylates are particularly preferred, in particular $C_1$–$C_8$-alkyl acrylates. The alkyl radicals may be either linear or branched or may form a ring. For example, methyl acrylate, ethyl acrylate, n-propyl acrylate, isopropyl acrylate, n-butyl acrylate, isobutyl acrylate, tert-butyl acrylate, n-pentyl acrylate, isopentyl acrylate, n-hexyl acrylate, 2-ethylhexyl acrylate, cyclohexyl acrylate, n-octyl acrylate, n-decyl acrylate or dihydrodicyclopentadienyl acrylate may be used.

Preferred block copolymers are those which are composed of methyl methacrylate and n-butyl acrylate blocks, tert-butyl acrylate blocks or tert-butyl methacrylate or 2-ethylhexyl acrylate blocks, in particular of methyl methacrylate and tert-butyl methacrylate.

According to the invention, the initiator composition contains an organic alkali metal compound or a mixture of different organic alkali metal compounds of this type. A preferred alkali metal is lithium, sodium or potassium. The choice of the alkali metal influences, inter alia, the reaction rate of the polymerization reaction, so that the choice of the metal depends on the monomers to be reacted and on the desired reaction rate. In general, organolithium compounds are preferred.

Alkyl- or alkylaryl-alkali metal compounds are preferably used. Their alkyl radical has, as a rule, 1 to 10, preferably 1 to 6, carbon atoms and may be linear, branched or cyclic. The alkylaryl radical has in general 1 to 10, preferably 1 to 6, carbon atoms in the alkyl group. The alkyl group is also substituted by one or more aryl radicals. Suitable aryl radicals are both monocyclic and polycyclic aryl radicals which as a rule have 6 to 18 carbon atoms. A preferred aryl radical is unsubstituted or substituted phenyl. Alkylaryl-alkali metal compounds are obtainable, for example, by reacting styrene or substituted styrenes, such as α-methylstyrene, or 1,1-diphenyl ethers or styrenes alkylated on the nucleus with an alkyl-alkali metal compound, for example n-butyllithium, sec-butyllithium or tert-butyllithium. Instead of styrene or derivatives thereof, it is also possible to use oligomers or polymers of these compounds. Typical alkyl- or alkylaryl-alkali metal compounds are, for example, n-butyllithium, sec-butyllithium, tert-butyllithium, diphenylmethyllithium, diphenylmethylsodium, diphenylmethylpotassium, 1,1,4,4-tetraphenylbutane-1,4-dilithium, 1,1,4,4-tetraphenylbutane-1,4-disodium, 1,1,4,4-tetraphenylbutane-1,4-dipotassium, 1-phenylhexyllithium, 1,1-diphenylhexyllithium, 3-methyl-1-phenylpentyllithium, 1,3-dimethyl-1-phenylpentyllithium or 3-methyl-1,1-diphenylpentyllithium.

Initiator compositions may contain, as a special organic alkali metal compound, an alkali metal ester enolate or a mixture of different enolates of this type.

Alkali metal enolates can be prepared separately and used as such.

The preparation of alkali metal enolates is known per se. They can be prepared, for example, by reacting an alkali metal salt, an alkyl-alkali metal compound or an alkali metal with an ester which has at least one acidic proton on the α-carbon atom. It is of course also possible to convert diesters into the alkali metal ester enolates present according to the invention. The alkali metal enolates thus obtained can then be isolated and purified.

The alkali metal enolates are preferably prepared using esters of the general formula II or III:

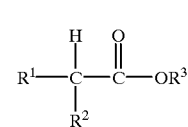

(II)

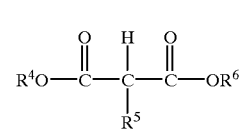

(III)

where $R^1$ to $R^6$ can be identical to or different from one another and, independently of one another, are each $C_1$–$C_{10}$-alkyl or $C_6$–$C_{18}$-aryl. $R^1$, $R^2$ and $R^5$ may furthermore be hydrogen. The alkyl radicals may be either linear or branched. In preferred esters I or II, $R^3$, $R^4$ and $R^6$ are each $C_1$–$C_5$-alkyl, such as methyl, ethyl, n-propyl, isopropyl, n-butyl, isobutyl or tert-butyl, particularly preferably methyl or tert-butyl. $R^1$, $R^2$ and $R^5$ are preferably $C_1$–$C_8$-alkyl, particularly preferably methyl, ethyl, isobutyl or 2,2-dimethylpentyl.

For example, methyllithium isobutyrate, ethyl-α-lithium isobutyrate or tert-butyllithium isobutyrate is obtainable from esters of the general formula II. The esters of the general formula II can also be converted, for example, into 2-lithium-2,4,4-trimethylpentanoic acid methyl ester enolate. Alkyllithium malonates, such as 2-lithium-2-($C_1$–$C_5$-alkyl)-1,3-propanedicarboxylic acid dialkyl ester enolates, in particular 2-lithium-2-ethyl-1,3-propanedicarboxylic acid dimethyl ester enolate, can be prepared from the ester of the general formula (III).

It is also possible to use different alkali metal ester enolates, so that different alkali metal ester enolates are present in the initiator composition.

According to the invention, the initiator composition contains an organic aluminum compound in addition to an alkali metal ester enolate. According to the invention, it is also possible to use different aluminum compounds. Alkylaluminum compounds are preferred. The alkyl radicals on the aluminum may be identical or different and contain in general 1 to 10, preferably 1 to 6, carbon atoms. They may be linear, branched or cyclic. Examples of aluminum compounds are trimethylaluminum, triethylaluminum, triisopropylaluminum, triisobutylaluminum, trineopentylaluminum and trinorbornylaluminum. Alkylaluminum alcoholates and alkylaluminum phenolates which are unsubstituted or alkyl- or alkoxy-substituted on the phenyl ring are also suitable, for example diisobutylaluminum 2,6-di-tert-butyl-4-methylphenolate.

According to the invention, the initiator composition contains an additive C) which forms complexes with alkali metal cations. This includes, for example, the linear polyethers having linear or branched alkyl radicals of 1 to 8 carbon atoms between the ether functions and at the chain ends. The readily obtainable dimethyl ethers, such as dimethoxyethane (DME) and triethylene glycol dimethyl ether (triglyme), are preferred. Higher molecular weight polyethers, such as polyethylene oxide or polytetrahydrofuran, are also suitable. A further class of compounds which form complexes with alkali metal ions comprises the macrocyclic polyethers, also known as crown ethers, and cryptands. Examples of these are dibenzo-18-crown-6 (2,3,11,12-dibenzo-1,4,7,10,13,16-hexaoxacyclooctadeca-2,11-diene),
poly-[dibenzo-18-crown-6-co-formaldehyde],
dibenzo-24-crown-8 (2,3,14,15-dibenzo-1,4,7,10,13,16,19,22-octaoxacyclotetracosa-2,14-diene),
dibenzo-30-crown-10 (2,3,17,18-dibenzo-1,4,7,10,13,16,19,22,25,28-decaoxacyclotriaconta-2,17-diene),
N,N'-dibenzyl-4,13-diaza-18-crown-6 (N,N'-dibenzyl-1,4,10,13-tetraoxa-7,16-diazacyclooctadecane),
12-crown-4 (1,4,7,10,-tetraoxacyclododecane),
15-crown-5 (1,4,7,10,13-pentaoxacyclopentadecane),
18-crown-6 (1,4,7,10,13,16-hexaoxacyclooctadecane),
1-aza-12-crown-4,
1-aza-15-crown-5,
1-aza-18-crown-6,
benzo-15-crown-5,
benzo-18-crown-6,
dicyclohexano-18-crown-6 (cis-2,3,11,12-dicyclohexano-1,4,7,10,13,16-hexaoxacyclooctadecane),
dicyclohexano-24-crown-8 (2,3,14,15-dicyclohexano-1,4,7,10,13,16,19,22-octaoxacyclotetracosane),
4,10-diaza-15-crown-5 (1,7-diaza-4,10,13-trioxacyclopentadecane(7,13-1,4,10) $\hat{=}$ [2.1]cryptand,
4,13-diaza-18-crown-6 (1,10-diaza-4,7,13,16-tetraoxacyclooctadecane(7,16-1,4,10,13),
1,10-diaza-4,7,13,16,21,24-hexaoxabicyclo[8.8.8] hexacosane) = [2.2.2] cryptand,
1,10-diaza-4,7,13,16,21-pentaoxabicyclo[8.8.5]tricosane $\hat{=}$ [2.2.1] cryptand,
1,10-diaza-4,7,13,18-tetraoxabicyclo[8.5.5]eicosane $\hat{=}$ [2.1.1] cryptand,
5,6-benzo-4,7,13,16,21,24-hexaoxa-1,10-diazabicyclo [8.8.8]hexacosane, [2.2.2] cryptand B
1,4,7,10,13,16-hexaoxacyclooctadecane.

The choice of the suitable macrocyclic polyether depends on the ionic radius of the alkali metal cation used and is generally known. For the preferred use of lithium as the organic alkali metal compound A), for example, 12-crown-4 or [2.1.1] cryptand is chosen.

Suitable further novel additives C) are quaternary cations of the general formula I

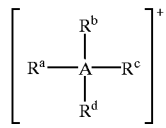

(I)

where
A is N, P, As or Sb and
$R^a$, $R^b$, $R^c$ and $R^d$,
independently of one another, are each unsubstituted or substituted alkyl, cycloalkyl, aralkyl or aryl, where two neighboring radicals, together with the heteroatom A, may form a 5- or 6-membered heterocyclic structure which may contain one or two further heteroatoms selected from nitrogen, oxygen and sulfur atoms.

Examples of typical novel components C) of the formula I are tetramethylammonium, tetraethylammonium, trimethylbenzylammonium, trimethyldodecylammonium, tetrabutylammonium, dimethylpiperidinium, dimethylmorpholinium, trimethylanilinium and 1,1-dicyanoethyltetrabutylammonium. Because they are easily obtainable, tetraalkylammonium ions, such as tetramethyl-, tetraethyl- and tetrabutylammonium ions, and tetraphenylphosphonium, tetraphenylarsonium and tetraphenylstibonium ions are particularly preferred. The stated cations are usually used in the form of their salts with inorganic acids, for example as halides, pseudohalides, chlorates, perchlorates, nitrates, sulfonates, trifluoromethane-sulfonates, tetrafluoroborates, triphenylborates, hexafluorophosphates, hexafluoroantimonates or hexafluorostilbates, or with organic acids having a $pK_s$ less than that of water, for example as acetates or benzoates. They are particularly preferably used in the form of halides, in particular chlorides, bromides or iodides, or in the form of cyanides or thiocyanates.

Depending on the desired polymerization result or desired polymerization parameters, such as rate of reaction, the composition of the initiator may vary within wide limits. In general, the molar ratio of the alkylaluminum compound to the organic alkali metal compound in the initiator composition is from 0.5:1 to 10:1, preferably from 1:1 to 5:1, and that of additive C) to the organic alkali metal compound is from 0.5:1 to 1000:1, preferably from 1:1 to 200:1.

As a rule, the molar ratio of monomer to organic alkali metal compound is chosen in the range from 5:1 to 10000:1. Preferred molar ratios of organic alkali metal compound to monomer are from 10:1 to 5000:1, in particular from 50:1 to 3000:1.

The polymerization may be carried out either in the presence or in the absence of a solvent. In general, the polymerization is carried out in a solvent. Nonpolar solvents are preferably used. These include aromatic hydrocarbons, such as toluene, benzene, xylene and ethylbenzene. However, mixtures of different nonpolar solvents, such as mixtures of toluene with ethylbenzene or mixtures of aromatic and aliphatic hydrocarbons, eg. cyclohexane, hexane or pentane, may also be used. A preferred solvent is toluene or ethylbenzene. Solvents which have the high purity typically required for the process are preferably used.

If polymerization is effected in the presence of a solvent, the reaction of the monomers may be carried out at different degrees of dilution. For example, the amount by weight of the monomers in the total batch may be from 0.5 to 80%, preferably from 1 to 50%.

In principle, the components of the initiator composition, the solvent and the monomers may be mixed with one another in a very wide range of sequences. For example, all initiator components may be initially taken and the solvent and monomers then added. However, it is also possible initially to use some of the initiator components and to add some other initiator components later. It is also possible to add further amounts of initiator composition during the polymerization reaction. However, preferably the solvent is initially taken and the aluminum compound is first added. The alkali metal enolate, which was prepared separately, can then be added to this mixture. Alternatively, as described above, an alkyl- or alkylaryl-alkali metal compound may be added and then converted in situ into the alkali metal enolate by reaction with a stoichiometric amount of an alkyl methacrylate, preferably of the monomer used in the polymerization. In general, the additive which forms a complex with alkali metal ions is then added, followed by the addition of the monomer. The individual components of the initiator composition may be used as such. It is also possible to use the components of the initiator composition in solution or dispersion in one of the stated solvents or solvent mixtures. The components are each preferably used as a solution in pentane, hexane, toluene, ethylbenzene or cyclohexane. It is suitable to add the total amount of monomer all at once, stepwise or continuously.

The reaction can be carried out, for example, at from −78 to 50° C. A temperature range of from −30 to +30° C., in particular from −20 to 0° C., is preferred. During the reaction, either the temperature may be kept virtually constant or the reaction can be subjected to a temperature program.

After the molecular weight has been established, the polymerization reaction is generally terminated by adding a protic substance, for example an alcohol, such as methanol or ethanol, or acetic acid, formic acid, hydrochloric acid or water or a mixture of these compounds.

The reaction mixture can then be worked up, for example by methods known per se. Thus, the poly(meth)acrylate obtained can be precipitated, for example by means of a lower alcohol or water, or the solvent can be removed from the reaction mixture.

The poly(meth)acrylates, preferably polymethyl (meth) acrylates, obtainable by the novel process generally have number average molecular weights ($M_n$) of from 5000 to 1000000, preferably from 5000 to 300000, g/mol. Since gel formation occurs only to a minor extent, if at all, in the novel process, they have a narrow molecular weight distribution, expressed as the ratio of weight average molecular weight to number average molecular weight $M_w/M_n$. As a rule, $M_w/M_n$ is from 1.05 to 1.6, preferably from 1.05 to 1.4. Moreover, highly syndiotactic poly(meth)acrylates are obtained in the novel process. The proportion of syndiotactic triads rr is in general from 50 to 85%, preferably from 60 to 80%.

The novel process is distinguished by the fact that the process parameters, such as reaction rate and temperature, can be readily controlled. On the other hand, complete or virtually complete conversions are achieved. In addition, the process is substantially less sensitive than known processes to impurities which are present in the solvents and monomers of industrial quality.

Block copolymers can also be prepared by the novel process. For this purpose, instead of the polymerization reaction being terminated with protic substances after the molecular weight has been established, further monomers or monomer mixtures differing from the first addition are added. This makes it possible to attach a plurality of blocks.

EXAMPLES

The Examples were carried out in the absence of oxygen and moisture, using the usual inert gas technique.

The number average and weight average molecular weights Mn and Mw were determined by means of gel permeation chromatography, unless stated otherwise, using polymethyl methacrylate standards.

The tacticity of the resulting poly(meth)acrylates was determined by means of $^1$H-NMR spectroscopy.

Preparation and purification of the starting compounds:

Ethyl-α-lithium isobutyrate (EiBLi) was prepared from ethyl isobutyrate and lithium isopropylamide in hexane and was recrystallized from diethyl ether.

Trimethylaluminum (AlMe$_3$) as a 2 M solution in toluene, triethylaluminum (AlEt$_3$) as a 25% strength solution in toluene and triisobutylaluminum (AliBu$_3$) as a 1.0 M solution in toluene were obtained from Aldrich.

tert-Butyllithium (t-BuLi) was used in the form of a 1.5 M solution in pentane.

1,4,7,10-Tetraoxacyclododecane (12-crown-4) from Aldrich was stirred over CaH$_2$ and filtered.

The toluene used was stirred over a Na/K alloy and distilled.

The monomeric acrylates were purified by flushing with nitrogen and treatment with alumina and calcium hydride and were then distilled under reduced pressure.

Ethylbenzene was purified over alumina.

Example 1

0.7 mmol of triethylaluminum (AlEt$_3$) in toluene and 28 mg (0.23 mmol) of ethyl-α-lithium isobutyrate (EiBLi) in toluene were introduced with stirring into the reaction vessel cooled to 0° C., and 50 mg (0.28 mmol) of 1,4,7,10-tetraoxacyclododecane (12-crown-4) in toluene and 11.5 mmol of methyl methacrylate in toluene were added in quick succession. The amount of toluene was such that the total volume of the reaction solution was 50 ml. After 5 minutes, the reaction was terminated by adding 5 ml of a 9:1 methanol/glacial acetic acid mixture and the solvent was removed under reduced pressure. The resulting polymer was taken up in benzene and the solution was filtered and freeze-dried. The properties of the polymer are listed in Table 1.

Examples 2 to 7

Example 1 was repeated using the experimental conditions and starting materials shown in Table 1. In Example 5, the reaction vessel was precooled to −78° C. In Examples 6 and 7, n-butyl acrylate (nBA) was used as the monomer.
Comparative Experiment V1

Example 1 was repeated without triethylaluminum, maintaining the experimental parameters shown in Table 1.
Comparative Experiment V2

Example 1 was repeated without the crown ether and with diisobutylaluminum 2,6-di-tert-butyl-4-methylphenolate (iBu)$_2$Al(BHT), maintaining the experimental parameters shown in Table 1.

Examples 8 and 9

For the preparation of block copolymers P(MMA-b-nBA), a polymethyl methacrylate block was first prepared as described in Example 1, but without the reaction being terminated with the methanol/glacial acetic acid mixture. A small sample was taken for characterization. The mixture was then rapidly cooled to the temperature for the polymerization of the butyl acrylate block, and 12.5 mmol of n-butyl acrylate (nBA) were added rapidly to the reaction solution. The reaction was then terminated and worked up, as described in Example 1. The experimental parameters of the block copolymerization are shown in Table 1.

TABLE 1

Initiator composition ethyl-α-lithium isobutyrate (Ei/BLi)/12-crown-4/trialkylaluminum

| Exp. | T/° C. | EiBLi mmol/l | 12-crown-4 mmol/l | AlR$_3$ mmol/l | Monomers mmol/l | Reaction time (min) | Monomer-conversion (%) | $M_n$ (exp) g/mol | $M_w/M_n$ | Syndio-tacticity rr |
|---|---|---|---|---|---|---|---|---|---|---|
| 1 | 0 | 4.53 | 4.56 | 1.57(AlEt$_3$) | 232 MMA | 5 | 100 | 8800 | 1.12 | 0.63 |
| 2 | 0 | 4.60 | 6.80 | 1.40(AlMe$_3$) | 230 MMA | 4 | 84 | 10300 | 1.31 | — |
| 3 | 0 | 4.60 | 5.70 | 1.40(AlEt$_3$) | 230 MMA | 4 | 100 | 9300 | 1.09 | — |
| 4 | 0 | 4.60 | 5.70 | 1.40(AliBu$_3$) | 230 MMA | 4 | 100 | 9900 | 1.11 | — |
| 5 | −78 | 8.50 | 9.00 | 2.00(AliBu$_3$) | 500 MMA | 30 | 100 | 7900 | 1.29 | — |

TABLE 1-continued

Initiator composition ethyl-α-lithium isobutyrate (Ei/BLi)/12-crown-4/trialkylaluminum

| Exp. | T/° C. | EiBLi mmol/l | 12-crown-4 mmol/l | AlR$_3$ mmol/l | Monomers mmol/l | Reaction time (min) | Monomer-conversion (%) | M$_n$ (exp) g/mol | M$_w$/M$_n$ | Syndio-tacticity rr |
|---|---|---|---|---|---|---|---|---|---|---|
| V1 | 0 | 4.68 | 4.75 | — | 233 MMA | 5 | 89 | 7100 | >20 | 0.21 |
| V2 | −23 | 4.60 | — | 17.0 iBu$_2$Al (BHT) | 230 MMA | 10 | 21 | 1410 | 1.07 | 0.71 |
|    |    |      |      |                      |          | 60 | 96 | 5570 | 1.20 |      |
| 6 | −78 | 8.50 | 9.00 | 2.00(AliBu$_3$) | 350 nBA | 10 | 67 | 3600 | 5.30 | — |
| 7 | 0 | 6.14 | 8.51 | 2.00(AlMe$_3$) | 350 nBA | 5 | 10 | 540 | 2.46 | — |
| 8 | −78 | 2.30 | 2.80 | 0.88(AlEt$_3$) | 280 (MMA) | 15 | 5 | 3300 | 1.73 | — |
|    | −78 |      |      |                | 250 (nBA) | 160 | 54 | 24600[*)] | 2.06 |    |
| 9 | 0 | 3.10 | 8.50 | 2.00(AlMe$_3$) | 470 (MMA) | 3 | 36 | 14700 | 1.15 | — |
|    | −79 |      |      |                | 700 (nBA) | 26 | 16 | 25700[*)] | 1.35 |   |

[*)]PnBA calibration

Example 10

A homogeneous solution prepared freshly at 25° C. under a nitrogen atmosphere from 1.57 mmol of triethylaluminum (AlEt$_3$) and 222 mg (0.69 mmol) of tetra-n-butylammonium bromide (NBu$_4$Br) in 10 ml of toluene was added to a solution, cooled to 0° C., of 57.3 mg (0.049 mmol) of ethyl-a-lithium isobutyrate (EiBLi) in 90 ml of toluene, and stirring was carried out for 5 minutes. 2.33 g (23.3 mmol) of methyl methacrylate (MMA) were added rapidly (in the course of about 1 second) at 0° C. to the initiator mixture thus prepared. After 5 minutes, the reaction was terminated by adding 5 ml of methanol and the solvent was removed under reduced pressure. The resulting polymer was taken up in benzene and the solution was filtered and freeze-dried.

Examples 11 to 25

Example 10 was repeated with the concentrations listed in Table 2a.

Comparative Experiment V3

The procedure was as in Example 10, except that no triethylaluminum was used.

TABLE 2a

Initiator composition ethyl-α-lithium isobutyrate (EiBLi)/tetra-n-butylammonium bromide (NBu$_4$Br)/triethylaluminum (AlEt$_3$)

| Exp. | [EiBLi] mmol/l | [NBu$_4$Br] mmol/l | [AlEt$_3$] mmol/l | [MMA] mmol/l | T/° C. | Reaction time/min | Conversion [%] | M$_n$ (exp.) g/mol | M$_w$/M$_n$ | Tacticity mm | mr | rr |
|---|---|---|---|---|---|---|---|---|---|---|---|---|
| V3 | 4.68 | 6.92 | —    | 233 | 0   | 5  | 89  | 6330   | 3.6  | 0.64 | 0.32 | 0.04 |
| 10 | 4.68 | 6.92 | 15.7 | 233 | 0   | 5  | 100 | 9230   | 1.10 | 0.04 | 0.30 | 0.66 |
| 11 | 4.49 | 6.74 | 15.1 | 233 | −19 | 3  | 100 | 6140   | 1.11 |      |      |      |
| 12 | 0.98 | 6.85 | 15.0 | 233 | −20 | 6  | 100 | 32300  | 1.06 |      |      |      |
| 13 | 0.49 | 6.89 | 15.0 | 233 | −20 | 13 | 100 | 60100  | 1.07 | 0.01 | 0.26 | 0.73 |
| 14 | 0.18 | 6.85 | 15.0 | 233 | −23 | 18 | 65  | 155000 | 1.19 |      |      |      |
| 15 | 0.49 | 6.80 | 15.0 | 50  | −20 | 13 | 98  | 15100  | 1.09 |      |      |      |
| 16 | 0.49 | 6.95 | 15.0 | 100 | −21 | 9  | 100 | 23100  | 1.09 |      |      |      |
| 17 | 0.49 | 6.90 | 15.0 | 502 | −21 | 20 | 94  | 245000 | 1.20 |      |      |      |
| 18 | 0.49 | 0.50 | 15.0 | 233 | −21 | 60 | 64  | 31700  | 1.82 |      |      |      |
| 19 | 0.49 | 2.00 | 15.0 | 233 | −20 | 15 | 91  | 61200  | 1.06 |      |      |      |
| 20 | 0.49 | 13.4 | 15.0 | 233 | −20 | 18 | 87  | 113000 | 1.12 | 0.01 | 0.36 | 0.63 |
| 21 | 0.49 | 0.50 | 1.14 | 233 | −20 | 60 | 83  | 57600  | 1.08 |      |      |      |
| 22 | 0.49 | 1.21 | 2.47 | 233 | −20 | 23 | 91  | 51700  | 1.08 |      |      |      |
| 23 | 0.49 | 3.44 | 7.41 | 233 | −20 | 10 | 100 | 49100  | 1.04 |      |      |      |
| 24 | 0.49 | 6.84 | 15.0 | 233 | −20 | 13 | 100 | 60100  | 1.07 |      |      |      |
| 25 | 0.49 | 6.84 | 15.0 | 233 | −20 | 5  | 60  | 62300  | 1.31 |      |      |      |

Examples 26 to 28

Example 10 was repeated using tetramethylammonium chloride (NMe$_4$Cl) and 2-ethylhexyl acrylate (EHA) or tert-butyl acrylate (tBA) or n-butyl acrylate (nBA), with the ratios and results listed in Table 2b.

TABLE 2b

Initiator composition ethyl-α-lithium isobutyrate (EiBLi)/tetramethylammonium chloride (NMe$_4$Cl)/trialkylaluminum

| Exp. No. | [EiBLi] mmol/l | [NMe$_4$Cl] mmol/l | [AlR$_3$] mmol/l | [Mon] mmol/l | T/° C. | Reaction time/min | Conversion [%] | M$_n$ (exp) g/mol | M$_w$/M$_n$ |
|---|---|---|---|---|---|---|---|---|---|
| 26 | 4.6 | 6.9 | 14 (AliBu$_3$) | 240 (EHA) | −78 | 150 | 80 | 13000 | 1.30 |
| 27 | 4.6 | 6.9 | 14 (AlMe$_3$) | 239 (tBA) | −78 | 100 | 85 | 70800 | 1.15 |
| 28 | 4.6 | 6.9 | 14 (AliBu$_3$) | 239 (nBA) | −78 | 45 | 97 | 32200 | 1.09 |

Examples 29 to 30

Example 10 was repeated using tetramethylammonium chloride or tetraphenylphosphonium chloride instead of tetra-n-butylammonium bromide, with the concentrations and experimental parameters stated in Table 2c.

TABLE 2c

Initiator composition ethyl-α-lithium isobutyrate (EiBLi)/tetra-n-methylammonium-(NMe$_4$Cl) or tetraphenylphosphonium chloride (PPh$_4$Cl)/triethylaluminum (AlEt$_3$)

|  | Example 29 | Example 30 |
|---|---|---|
| [EiBLi] mmol/1 | 0.49 | 0.49 |
| [MX] mmol/1 | 6.84 (NMe$_4$Cl) | 6.83 (PPh$_4$Cl) |
| [AlEt$_3$] mmol/1 | 15.0 | 15.0 |
| [MMA] mmol/1 | 233 | 233 |
| T/° C. | −20 | −20 |
| Reaction time/min | 40 | 18 |
| Conversion/% | 95 | 77 |
| M$_n$ (exp) g/mol | 75800 | 167000 |
| M$_w$/M$_n$ | 1.17 | 1.63 |
| Tacticity mm | 0.01 |  |
| Tacticity mr | 0.25 |  |
| Tacticity rr | 0.74 |  |

Examples 31 and 32

The procedure was as in Example 10 using the experimental parameters stated in Table 2d, the monomer used being tert-butyl methacrylate instead of methyl methacrylate.

TABLE 2d

Initiator composition ethyl-α-lithium isobutyrate (EiBLi)/tetra-n-butylammonium bromide (NBu$_4$Br)/triethylaluminum (AlEt$_3$)

|  | Example 31 | Example 32 |
|---|---|---|
| [EiBLi] mmol/1 | 0.49 | 4.57 |
| [NBu$_4$Br] mmol/1 | 6.85 | 6.92 |
| [AlEt$_3$] mmol/1 | 15.0 | 15.3 |
| [tBMA] mmol/1 | 232 | 426 |
| T/° C. | −20 | 0 |
| Reaction time/min | 25 | 5 |
| Conversion/% | 98 | 100 |
| M$_n$ (exp) g/mol | 152000 | 31100 |
| M$_w$/M$_n$ | 1.12 | 1.10 |

Example 33

4.85 mmol of triethylaluminum (AlEt$_3$) in toluene (2.6 ml of a 1.9 M solution) and 0.9 ml (1.35 mmol) of a 1.5 M tert-butyllithium solution in n-pentane were added to 105 ml of ethylbenzene in the reaction vessel at 0° C. while stirring.

After stirring had been carried out for 10 minutes, 5 ml of a solution of 1.65 mmol of methyl methacrylate in ethylbenzene were slowly added and stirring was continued for a further 15 minutes at 0° C., a yellow reaction solution being formed. A solution, prepared freshly at 25° C., of 0.49 mmol of triethylaluminum in toluene (1.9 M) and 4.4 ml (24.3 mmol) of triethylene glycol dimethyl ether was then added. After 3 minutes, 7.5 ml (70.5 mmol) of methyl methacrylate to which 0.3 ml of the 1.9 M triethylaluminum solution in toluene had been added beforehand were added to this initiator solution at −1° C. and polymerization was carried out for 1 hour at a cooling bath temperature of 0° C., the temperature of the material reaching 16° C. for a short time. The polymerization was then terminated by adding 2 ml of oxygen-free methanol and the resulting polymer was precipitated with methanol containing hydrochloric acid, filtered off and dried under reduced pressure.

Example 34 and 35

Example 32 was repeated using triisobutylaluminum instead of triethylaluminum, at 0° C. and −10° C. The results are summarized in Table 3.

Example 36

Example 33 was repeated using dimethoxyethane (DME) and the experimental parameters listed in Table 3.
Comparative Experiments V4 to V6

The procedure was as in Example 10, tert-butyllithium, instead of ethyl-α-lithium isobutyrate, and triethylaluminum, triisobutylaluminum or diisobutylaluminum 2,6-di-tert-butyl-4-methylphenolate (iBu$_2$Al(BHT)) being used without further additives C). The results are listed in Table 3.

Example 37

For the preparation of a block copolymer P(MMA-b-tBA), methyl methacrylate was first polymerized according to Example 1 at a coolant temperature of −10° C. After the temperature of the material had fallen to −10° C. (about 10 minutes), 51 mmol of tert-butyl acrylate were added to the reaction solution. After the temperature had decreased again to −10° C. after a brief increase to 11° C., the reaction was terminated with 5 ml of a 9:1 methanol/acetic acid mixture and the resulting block copolymer was precipitated with methanol containing hydrochloric acid.

Yield: 97%

Mn: 34 900 g/mol

Mw/Mn: 1.47

TABLE 3

Initiator composition tert-butyllithium/triglyme/organoaluminum compound

| Exp. | t-BuLi mmol/l | Triglyme mmol/l | $AlR_3$ mmol/l | MMA mmol/l | T/° C. | Reaction time [min] | Conversion [%] | $M_n$ (exp) | $M_w/M_n$ | Tacticity rr |
|---|---|---|---|---|---|---|---|---|---|---|
| 33 | 11.2 | 203 | 41 ($AlEt_3$) | 592 | 0 | 15 | 100 | 24400 | 1.34 | 0.70 |
| 34 | 11.2 | 203 | 41 ($AliBu_3$) | 592 | 0 | 15 | 100 | 24400 | 1.30 | 0.71 |
| 35 | 11.2 | 203 | 41 ($AliBu_3$) | 592 | −10 | 15 | 100 | 21200 | 1.24 | 0.71 |
| 36 | 11.1 | 208 (DME) | 42 ($AlEt_3$) | 600 | 0 | 60 | 96 | 18900 | 1.71 | 0.66 |
| 37 | 11.2 | 203 | 41 ($AliBu_3$) | 592 (MMA) 425 (tBA) | −10 | 15 20 | 97 | 34900 | 1.47 | |
| V4 | 4.1 | — | 15.3 ($AliBu_3$) | 230 | −22 | 120 1230 | 65 99 | 9430 16770 | 1.67 1.75 | 0.70 |
| V5 | 4.7 | — | 15.4 ($AlEt_3$) | 233 | −19 | 45 520 | 28 77 | 1825 4850 | 1.48 3.68 | 0.68 |
| V6 | 4.1 | — | 15.1 ($AliBu_2$) (BHT) | 230 | −24 | 10 120 | 29 98 | 2230 6760 | 1.43 2.12 | 0.70 |

We claim:

1. A process for the preparation of homopolymers, copolymers or block copolymers by anionic polymerization of acrylates or methacrylates in the presence of an initiator composition, wherein the initiator composition contains
   A) an organic alkali metal compound,
   B) an organic aluminum compound and
   C) an additive which forms a complex with the alkali metal cation and is selected from the group consisting of open-chain ethers having at least two ether oxygen atoms, macrocyclic ethers and cryptands, or from the group consisting of salts of quaternary cations of the formula I

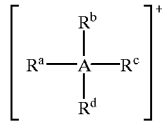

(I)

where
A is N, P, As or Sb and
$R^a$, $R^b$, $R^c$ and $R^d$,
independently of one another, are each unsubstituted or substituted alkyl, cycloalkyl, aralkyl or aryl, where two neighboring radicals, together with the heteroatom A, may form a 5- or 6-membered heterocyclic structure which may contain one or two further heteroatoms selected from nitrogen, oxygen and sulfur atoms.

2. A process as claimed in claim 1, wherein the organic alkali metal compound A) used is an alkali metal ester enolate.

3. A process as claimed in claim 1, wherein the organic alkali metal compound A) used is an organolithium compound.

4. A process as claimed in claim 1, wherein the organic aluminum compound B) used is an alkylaluminum compound.

5. A process as claimed in claim 1, wherein the complexing additive C) used is dimethoxyethane, triethylene glycol dimethyl ether, 12-crown-4 or [2.1.1] cryptand.

6. A process as claimed in claim 1, wherein the additive C) used is a tetramethylammonium, tetra-n-butylammonium, tetraethylammonium or tetraphenylphosphonium halide.

7. A process as claimed in claim 1, wherein the polymerization is carried out in a nonpolar solvent.

8. An initiator composition for polymerization of acrylates or methacrylates containing
   A) an organic alkali metal compound,
   B) an organic aluminum compound and
   C) an additive which forms a complex with the alkali metal cation and is selected from the group consisting of open-chain ethers having at least two ether oxygen atoms, macrocyclic ethers and cryptands, or from the group consisting of salts of quaternary cations of the formula I

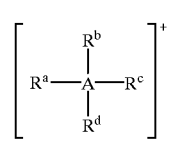

(I)

where
A is N, P, As or Sb and
$R^a$, $R^b$, $R^c$ and $R^d$,
independently of one another, are each unsubstitututed or substituted alkyl, cycloalkyl, aralkyl or aryl, where two neighboring radicals, together with the heteroatom A, may form a 5- or 6-membered heterocyclic structure which may contain one or two further heteroatoms selected from nitrogen, oxygen and sulfur atoms.

9. A process for the preparation of an initiator composition as claimed in claim 8, wherein
   1) an alkyl- or alkylaryl-alkali metal compound is mixed with an alkylaluminum compound in a first step,
   2) a stoichiometric amount of an alkyl (meth)acrylate relative to the alkali metal compound is added in a second step and
   3) C) is added in a third step.

* * * * *